Jan. 8, 1924. 1,480,485

K. G. YONCE

FASTENING BOLT OR RIVET

Filed Feb. 23, 1923

Inventor:
Kelley G. Yonce

By C. C. Hines,
Attorney

Patented Jan. 8, 1924.

1,480,485

UNITED STATES PATENT OFFICE.

KELLEY G. YONCE, OF RIDGE SPRING, SOUTH CAROLINA.

FASTENING BOLT OR RIVET.

Application filed February 23, 1923. Serial No. 620,801.

*To all whom it may concern:*

Be it known that I, KELLEY G. YONCE, a citizen of the United States, residing at Ridge Spring, in the county of Saluda and State of South Carolina, have invented new and useful Improvements in Fastening Bolts or Rivets, of which the following is a specification.

This invention relates to improvements in fastening bolts or rivets, and particularly to devices of this kind designed for connecting boiler sheets or other sheets or parts to be firmly and securely joined together.

One object of my invention is to provide a fastening bolt or rivet which may be readily and conveniently applied, and which is adapted to better withstand the stresses and strains than ordinary bolts or rivets, to ensure a continuity of connection of the parts and avoidance of the liability of the breakage of the bolt or fastening.

Another object of the invention is to provide a device of this character which is adapted to yield to a certain extent under excessive stresses or strains, without liability of becoming broken or of permitting separation of the sheets or other parts held joined thereby.

The invention consists of the features of construction, combination and arrangement of parts, hereinafter fully described and claimed, reference being had to the accompanying drawing, in which:—

Figure 1:
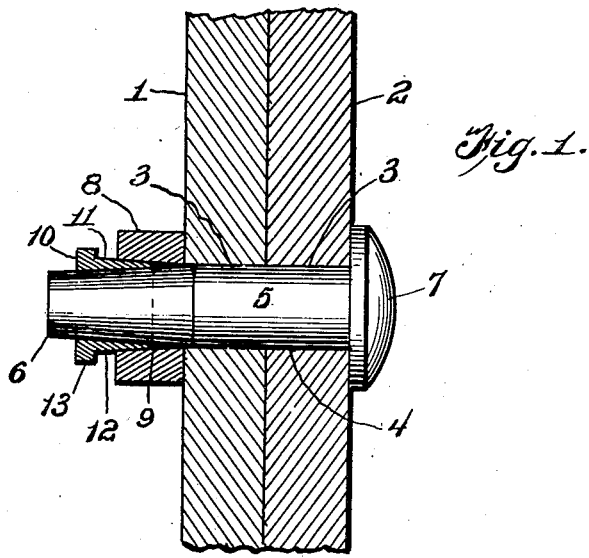
Figure 1 is a sectional view through two boiler sheets or the like held connected by my improved bolt or rivet, showing the parts as applied prior to the riveting down of the tapered bolt end.
Figure 4:
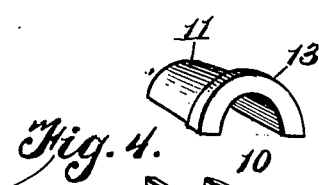
Figure 4 is a perspective view of the parts of the bushing separated but disposed in proper relative position.

Referring to the drawing, 1 and 2 respectively designate two boiler sheets or plates or other articles to be joined, which plates or articles are provided with registering openings 3 for the passage of my improved bolt 4.

The bolt 4 comprises a shank having a cylindrical portion 5 and a tapered end portion 6, the portion 5 being provided at its outer extremity with a fixed head 7 to bear upon the outer surface of one of the sheets, as the sheet 2. The cylindrical portion 5 is of a length somewhat less than the aggregate thickness of the sheets 1 and 2, and terminates, as shown, at its inner end a short distance inwardly of the outer surface of the outer sheet 1.

The tapered end 6 of the bolt is designed to project a certain distance beyond the outer face of sheet 1 and to receive a clamping collar 8. This collar 8 may be of circular or other approved form and bears at its inner side against the outer face of sheet 1. Said collar is provided with a bore 9 for the passage of the tapered bolt end 6, which bore is of substantially the same diameter as the portion of greatest diameter of the end 6 at its inner side, and increases gradually in diameter toward its outer side.

A split bushing 10 is provided to fit upon the tapered bolt end 6 and within the bore 9 of the collar 8. This bushing is made of metal and comprises two equal sections 11 and 12, tapering internally and externally to conform to the taper of the bolt end 6 and to the taper of the bore 9 of collar 8. The bushing sections are provided at their outer ends with flanges 13 extending therearound and increasing the diameter of the bushing at such end.

Figure 2:
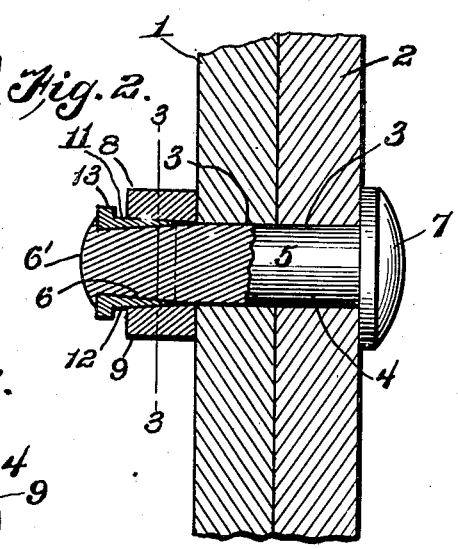
Figure 2 is a similar view showing the parts permanently joined together.
Figure 3:
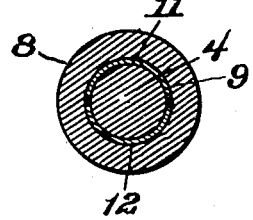
Figure 3 is a cross section on the line 3—3 of Figure 2.

The length of the tapered part of the bolt is such that when the parts are assembled, as shown in Figure 1, a portion of such tapered end will project beyond and in spaced relationship to the outer side of the collar 8. The body portions of the bushing halves project into the space between the bolt end 6 and wall of bore 9 of collar 8 to an extent equal to about one-half of the depth of the collar, and are adapted to be forced inwardly to a greater degree, as shown in Figure 2, so as to institute a wedging action binding the parts together and holding the collar 8 securely upon the tapered bolt end and against the outer face of the sheet 1. This wedging action will also draw the assembled parts closely together and in firm contact, and they may be held in such engagement in any suitable manner preliminary to and during the final operation of swaging down, upsetting or riveting the outer projecting extremity of the bolt end 6. Finally, the bolt end 6 is upset, as shown in Figure 2, to form a rivet head 6' which bears against the outer surface of the flanged end of the wedge bushing, thus permanently binding and connecting the parts together.

As a result of the action above described, it will be seen that the bushing will be wedged in tight engagement with the collar and tapered bolt end, holding the collar against the outer side of sheet 1, the sheets 1 and 2 thus being clamped and held firmly assembled between the head 7 and the collar 8. The bushing will be held in this wedging position against possibilty of displacement by the riveted end 6' of the bolt, so that it can not, under all ordinary conditions, become loosened and permit the collar to shift outwardly. If, however, under extraordinary stresses or strains, the sheets should tend to separate, and should move the collar 8 outwardly on the wedge bushing, the extent of movement will be positively limited by the flange 13 and riveted bolt end 6', which will hold the sheets from further separation. The movement thus allowed under extraordinary stresses and strains will reduce to a material extent liability of fracture or bending of the bolt, while at the same time preventing separation of the parts beyond a predetermined limit, which limit may be just a fraction of an inch or more, according to circumstances, and as occasion may be deemed most desirable in the application of the invention to various types of boilers or parts subjected to varying degrees of stresses and strains.

The improved bolt or rivet is thus of material advantage over ordinary bolts or rivets for the reasons set forth and may be applied for use at a cost but slightly, if any, exceeding the cost of ordinary bolts or rivets designed to give more or less satisfactory service. Also, should it be desired to remove the bolt or rivet, for the purpose of disconnecting the sheet, or for making repairs, or for other purposes, this may be done by chipping, or cutting off the projecting flange of the riveted head 6', without damage to the sheets or parts held by the bolt.

Having thus fully described my invention, I claim:

1. A bolt or rivet having a shank provided with a cylindrical end portion and a tapered end portion, a head upon the cylindrical end portion, a collar having a tapered bore adapted to fit upon the tapered end portion of the bolt, and a split wedge bushing adapted to be fitted upon the tapered end of the bolt and driven into said collar and to be held by riveting down the extremity of the tapered end of the bolt.

2. A fastening bolt or rivet having a shank provided with a cylindrical end portion and a tapered end portion, a head upon the tapered end portion, a collar adapted to be fitted upon the tapered end portion and having a tapered bore, an internally and externally tapered bushing composed of half sections adapted to be fitted upon the tapered end of the bolt and wedged into the tapered bore of the collar, said sections being provided at their outer ends with flanges, said bushing adapted to be held in position by riveting the extremity of the tapered bolt end into contact with the outer ends of said bushing sections and with said flanges.

3. The combination with two parts to be assembled, provided with registering openings, of a bolt or rivet having a shank provided with a cylindrical portion fitting in said openings and a tapered portion projecting beyond the outer face of one of said parts, a head upon the central portion of the bolt shank bearing against the outer face of the other of said portions, a collar surrounding the inner portion of the tapered bolt end and bearing against the outer surface of the first-named part, said collar having a tapered bore, and a split internally and externally tapered bushing fitted upon the tapered end of the bolt and in wedging engagement therewith and with the wall of the bore of the collar, said bushing having a flange at its outer end, the extremity of the tapered end of the bolt being riveted into engagement with the outer end of the bushing and with said flanges.

In testimony whereof I affix my signature.

KELLEY G. YONCE.